United States Patent
Sanchez-Monge et al.

(10) Patent No.: US 11,869,204 B2
(45) Date of Patent: Jan. 9, 2024

(54) AUTOMATIC CO-REGISTRATION OF THERMAL AND VISIBLE IMAGE PAIRS

(71) Applicant: Teledyne FLIR Commercial Systems, Inc., Goleta, CA (US)

(72) Inventors: Enrique Sanchez-Monge, Tampere (FI); Alessandro Foi, Tampere (FI); Michael Kent, Goleta, CA (US); Pieter Messely, Ronse (BE)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 322 days.

(21) Appl. No.: 17/306,891

(22) Filed: May 3, 2021

(65) Prior Publication Data

US 2021/0272300 A1    Sep. 2, 2021

Related U.S. Application Data (63) Continuation of application No. PCT/US2019/059936, filed on Nov. 5, 2019.
(Continued)

(51) Int. Cl.
*G06T 5/00* (2006.01)
*G06T 7/33* (2017.01)
(Continued)

(52) U.S. Cl.
CPC ............ *G06T 7/337* (2017.01); *B64C 39/024* (2013.01); *G06T 3/40* (2013.01); *G06T 5/006* (2013.01);
(Continued)

(58) Field of Classification Search
CPC ... G06T 2207/10048; G06T 7/30; G06T 5/40; G06T 5/50; G06T 3/40; G06T 5/006;
(Continued)

(56) References Cited

U.S. PATENT DOCUMENTS 5,963,664 A * 10/1999 Kumar .................... G06T 7/593
  382/284
6,219,462 B1   4/2001 Anandan et al.
(Continued)

FOREIGN PATENT DOCUMENTS

CN    102298779 A    12/2011
CN    102567979 A     7/2012
(Continued)

OTHER PUBLICATIONS

Wolberg, George, and Siavash Zokai. "Robust image registration using log-polar transform." Proceedings 2000 International Conference on Image Processing (Cat. No. 00CH37101). vol. 1. IEEE, 2000.*

(Continued)

*Primary Examiner* — Li Liu
(74) *Attorney, Agent, or Firm* — Haynes and Boone, LLP (57) ABSTRACT

Image pair co-registration systems and methods include receiving a pair of multi-modal images, defining a parametric deformation model, defining a loss function that is minimized when the pair of images are aligned, and performing a multi-scale search to determine deformation parameters that minimize the loss function. The optimized deformation parameters define an alignment of the pair of images. The pair of images may include visible spectrum image and an infrared image. The method further includes resizing the visible spectrum image to match the infrared image, applying at least one lens distortion correction model, and normalizing a dynamic range of each of the pair of images. The multi-scale search may further include resizing the pair of images to a current processing scale, applying adaptive histogram equalization to the pair of images to generate equalized images, applying Gaussian Blur to the equalized images, and optimizing the deformation parameters.

20 Claims, 4 Drawing Sheets

Related U.S. Application Data (60) Provisional application No. 62/756,519, filed on Nov. 6, 2018.

(51) Int. Cl.
  *B64C 39/02* (2023.01)
  *G06T 3/40* (2006.01)
  *G06T 5/40* (2006.01)
  *G06T 5/50* (2006.01)
  *B64U 101/30* (2023.01)

(52) U.S. Cl.
  CPC .............. *G06T 5/007* (2013.01); *G06T 5/40* (2013.01); *G06T 5/50* (2013.01); *B64U 2101/30* (2023.01); *G06T 2207/10048* (2013.01); *G06T 2207/20016* (2013.01)

(58) Field of Classification Search
  CPC .......... G06T 5/007; G06T 7/337; G06T 7/33; G06T 7/32; G06V 10/24; G06V 10/7515; G06V 30/2504
  See application file for complete search history.

(56) References Cited

U.S. PATENT DOCUMENTS

| | | | |
|---|---|---|---|
| 8,890,934 | B2 | 11/2014 | Li et al. |
| 2006/0115181 | A1 | 6/2006 | Deng et al. |
| 2008/0278584 | A1* | 11/2008 | Shih ................ G06T 7/215 348/169 |
| 2015/0324656 | A1 | 8/2015 | Marks et al. |
| 2015/0286044 | A1* | 10/2015 | Rout .................. G02B 21/367 382/163 |
| 2015/0371387 | A1 | 12/2015 | Atanassov et al. |
| 2018/0276469 | A1 | 9/2018 | Richards et al. |
| 2019/0058859 | A1* | 2/2019 | Price .................. H04N 13/271 |

FOREIGN PATENT DOCUMENTS

| | | |
|---|---|---|
| CN | 102915444 A | 2/2013 |
| CN | 104134208 A | 11/2014 |
| CN | 104995910 A | 10/2015 |
| CN | 108171787 A | 6/2018 |
| CN | 108604373 A | 9/2018 |

OTHER PUBLICATIONS

Kybic, Jan, and Michael Unser. "Fast parametric elastic image registration." IEEE transactions on image processing 12.11 (2003): 1427-1442.*

Evangelidis, Georgios D., and Emmanouil Z. Psarakis. "Parametric image alignment using enhanced correlation coefficient maximization." IEEE transactions on pattern analysis and machine intelligence 30.10 (2008): 1858-1865.*

Zheng, Yufeng Ed et al, "A channel-based color fusion technique using multispectral images for night vision enhancement", Applications of Digital Processing XXXIV, SPIE, 1000 20$^{th}$ St. Bellingham WA 98225-6705 USA, vol. 8135, No. 1, Sep. 12, 2011 pp. 1-13.

* cited by examiner

AUTOMATIC CO-REGISTRATION OF THERMAL AND VISIBLE IMAGE PAIRS

CROSS-REFERENCE TO RELATED APPLICATIONS

This application is a continuation of International Patent Application No. PCT/US2019/059936 filed Nov. 5, 2019 and entitled "AUTOMATIC CO-REGISTRATION OF THERMAL AND VISIBLE IMAGE PAIRS," which is hereby incorporated by reference in its entirety.

International Patent Application No. PCT/US2019/059936 claims priority to and the benefit of U.S. Provisional Patent Application No. 62/756,519 filed Nov. 6, 2018 and entitled "AUTOMATIC CO-REGISTRATION OF THERMAL AND VISIBLE IMAGE PAIRS", which is hereby incorporated by reference in its entirety.

TECHNICAL FIELD

One or more embodiments of the present disclosure relate generally to imaging systems, and more particularly, for example, to systems and methods for registration of two or more images.

BACKGROUND

In the field of image processing, there is an ongoing need for efficient and reliable ways to analyze images captured by imaging devices. Some systems include a plurality of image sensors and/or cameras to capture images of one or more fields of view (e.g., image of a scene). Capturing a plurality of images of a scene allows for analysis of a multiple sets of image data that may be used to increase accuracy of analysis and detection systems. In one common approach, a system utilizes a pair of stereo cameras or sensors to capture pairs of images having the same characteristics, that may then be aligned and/or stitched together by identifying points in one image that correspond with points in the other image. However, different image capture parameters between the image pairs (e.g., camera locations, capture time, sensor type such as infrared and visible sensors) can make image registration challenging. Further, real time processing systems require efficient image registration processing. In view of the foregoing, there is a continued need in the art for improved image registration systems and methods that are both efficient and accurate.

SUMMARY

Various systems and methods are provided for image registration of multi-modal images, including pairs of infrared and visible images. The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

The present disclosure provides improved systems and methods for cross-modal image registration that is well suited for registration of a series of visible image and infrared image pairs. The systems and methods disclosure herein may be implemented in any multi-modal image capture system that captures two or more images of a scene, including unmanned aerial vehicle systems, video surveillance systems, and other image capture systems.

Figure 1:
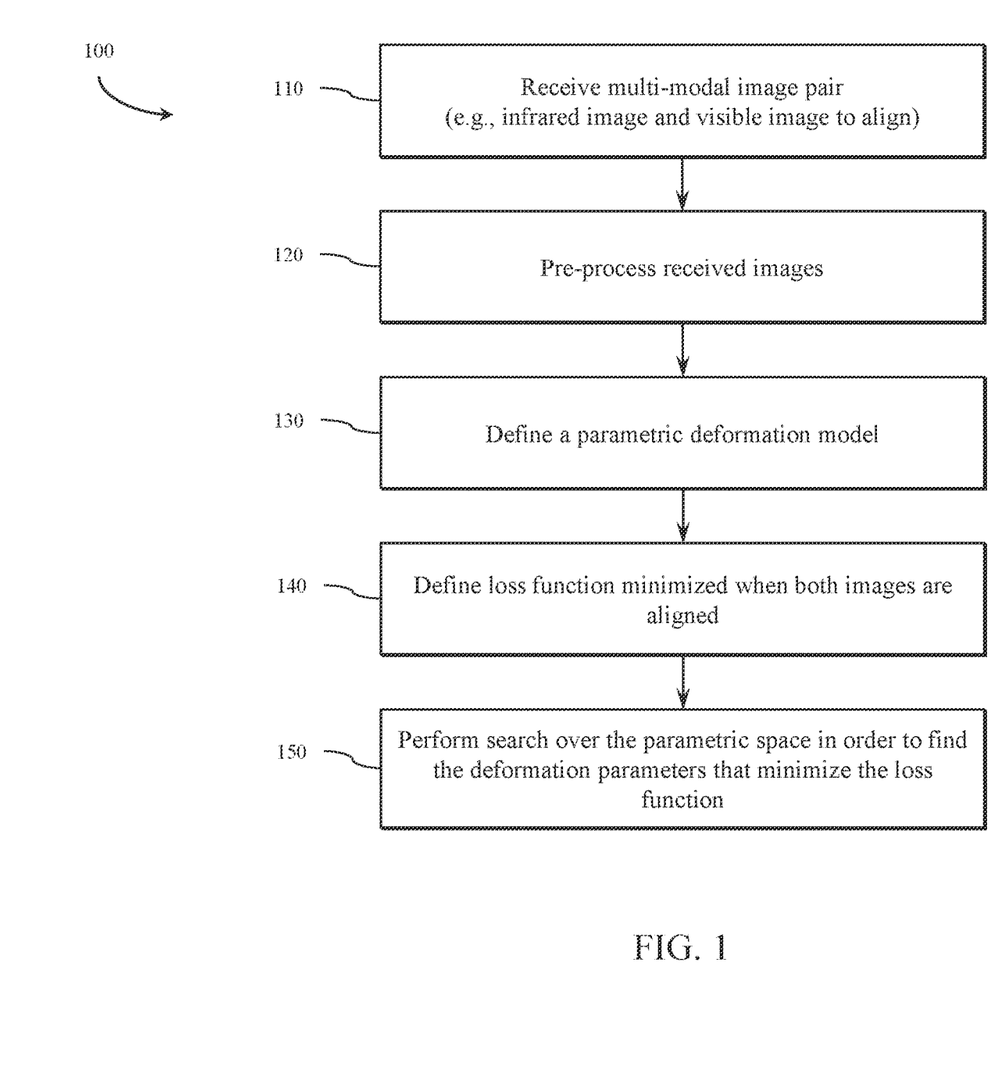
FIG. 1 illustrates an example image pair co-registration process, in accordance with various embodiments of the present disclosure.

Referring to FIG. 1, an example image pair co-registration process 100 will be described, in accordance with various embodiments of the present disclosure. In various embodiments, an image capture system captures two images of a scene simultaneously—one in the visible spectrum and one in the infrared spectrum. The images are received by the image pair co-registration process at step 110, and the images are pre-processed in step 120 to conform the images for use in the optimization process disclosed herein. The infrared image is deformed to align with the visible image using a process that includes defining a parametric deformation model in step 130, defining a loss function that is minimized when both images are aligned in step 140, and performing a search over the parametric space to find the deformation parameter that minimizes the loss function in step 150.

Referring to step 130, in some embodiments the image pair is aligned by deforming one of the images in the pair (e.g., the infrared image) in such way that the pixels in the same position of the other image in the pair correspond to the same object in the scene. It is noted that without knowing the three-dimensional structure of the scene, it may not be possible to create a perfect alignment of both images in many practical implementations (e.g., due to parallax and three-dimensional perspective), and that only an approximation will be found for many image pairs. It is further noted that simpler models allow for less adaptation to complex scenes (e.g., with parallax and complex perspectives), but provide a faster and easier search of the optimal parameters. One goal of various embodiments disclosed herein is the implementation of a simple deformation model that provides improved adaptation for practical applications. The present disclosure includes a deformation model using a similarity transformation with 4 degrees of freedom (translation, rotation, scaling), that allows for a fast search while providing flexibility to align most of the scene content for applications such as unmanned aerial systems.

As used in the present disclosure, the image parametric deformation is denoted as $\mathcal{D}_p$ where $p \in \mathbb{R}^4$, is created as a composition of a scaling (zoom), a rotation and a translation, defined by $p=[\delta x, \delta y, s, \phi]$, where s is a scaling factor that controls the scaling of the image, $\phi$ controls the rotation in degrees of the image, and $\delta x$ and $\delta y$ control the translation of the image (in pixels) in horizontal and vertical direction, respectively. A process performs the similarity transformation on an input image given by parameter p. In some embodiments, more complex translations, such as a 2D affine transformation (with 6 degrees of freedom) or 2D projective transformation (with 8 degrees of freedom) and transformations that allow compensation to some degree perspective changes, can be used at the expense of more computational complexity.

Referring to step 140, an embodiment of a loss function for will now be described. Given an image pair, z and y, the alignment or registration is done by deforming one of the images in the pair (y) in such way that a loss function is minimized. As used herein, z represents an image in the visual spectrum and y represents an image in the infrared spectrum. A loss function may be created by comparing directional gradients of both images such that for every pixel position (i,j) the process subtracts, squares and accumulates the magnitude of 8 directional gradients in a 3×3 neighborhood of the pixel:

$$\varepsilon_{i,j}(z,y) = \Sigma_\theta (|\nabla_\theta(z(i,j))| - |\nabla_\theta(y(i,j))|)^2 \quad (1)$$

where $\nabla_\theta$ denotes a directional gradient in the direction defined by $\theta = 0°, 45°, \ldots, 315°$. The loss function used in the optimization of the deformation parameters $p \in \mathbb{R}^4$ is then defined as the accumulation of Equation (1) over all pixels:

$$\mathcal{L}_p(z,y) = \Sigma_{i,j} \varepsilon_{i,j}(z, \mathcal{D}_p(y)) + \alpha \mathcal{P}(p) \quad (2)$$

where $\mathcal{D}_p$ is the parametric deformation model used on the image y, and $\mathcal{P}(p)$ is a penalty term on the deformation parameter $p \in \mathbb{R}^4$. The parameter a in Equation (2) controls the strength of the loss penalty. The optimal deformation that aligns z and y is found by minimizing Equation (2):

$$p = \arg\min_p \{\mathcal{L}_p(z, y)\} = \arg\min_p \left\{ \sum_{i,j} \varepsilon_{i,j}(z, \mathcal{D}_p(y)) + \alpha \mathcal{P}(p) \right\} \quad (3)$$

Embodiments of the loss function penalty term will now be described. The optimization in Equation (3) uses a penalty term on the parameter space designed to maintain the deformation parameters within some reasonable values (e.g., values which may be defined by the user for each specific case):

$$\mathcal{P}(p) = \Sigma(\max(p_{min} - p, \max(p - p_{max}, 0))) \quad (4)$$

where $p_{min}, p_{max} \in \mathbb{R}^4$ are respectively the minimum and maximum bounds on the parameter $p \in \mathbb{R}^4$. In one embodiment, the bounds for parameter p are controlled by the user for each specific use scenario (e.g., a camera pair set-up) by defining a maximum absolute translation $\delta_{max}$ (in pixels), maximum scaling factor $s_{max}$, minimum scaling factor $s_{min}$, and maximum absolute rotation $\phi_{max}$ (in degrees):

$$p_{min} = -[-\delta_{max}, -\delta_{max}, s_{min}, -\phi_{max}]$$

$$p_{max} = [\delta_{max}, \delta_{max}, s_{max}, \phi_{max}]$$

In another embodiment, a more general case be defined including a minimum translation ($\delta_{min}$), a maximum translation ($\delta_{max}$), a minimum rotation ($\phi_{min}$) and a maximum rotation ($\phi_{max}$). Then $p_{min}$ and $p_{max}$ would be defined as follows:

$$p_{min} = [\delta_{min}, \delta_{min}, s_{min}, \phi_{min}]$$

$$p_{max} = [\delta_{max}, \delta_{max}, s_{max}, \phi_{max}]$$

Referring to step 150, embodiments for parameter optimization will now be described. Given the parametric deformation model (step 130) and the loss function (step 140), the parameters minimizing Equation (3) may be found by means of a Nelder-Mead search or other appropriate numerical method for finding the minimum of Equation (3).

The parameter optimization may be performed in a multi-scale approach, providing a coarse-to-fine deformation parameter estimation. Embodiments of a multi-scale, image alignment algorithm 200 will now be described with reference to FIG. 2. An image pair is received at step 202 including a visible image (vis_frame) and an infrared image (ir_frame). It will be understood that while the image alignment algorithm is described with reference to visible and infrared image pairs, other image types may be used consistent with the teachings of the present disclosure.

Figure 2:
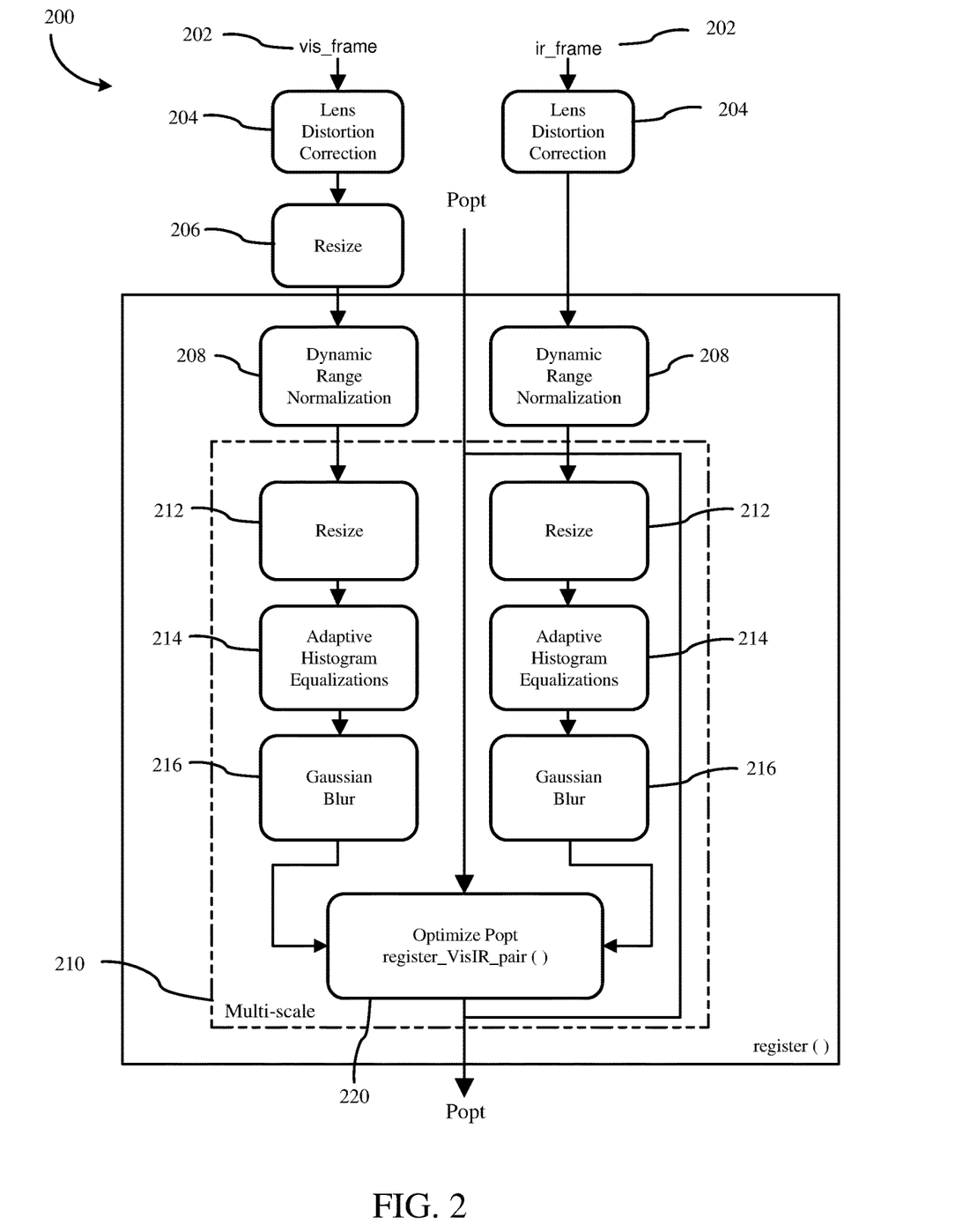
FIG. 2 illustrates an example multi-scale image pair co-registration process, in accordance with various embodiments of the present disclosure.

The input image pair is then pre-processed to accommodate the images to the optimization process described herein. The pre-processing algorithm takes as input two images z and y (visual image/frame and infrared image/frame). In step 204, the images are processed to compensate for the lens distortion in both images. In one embodiment, the lens distortion function accurately models the effects of the optical components on the captured image in a known image capture device. In other embodiments, a generic lens distortion function may be used where the lens properties are unknown. Often, an image in the visible spectrum will have a higher resolution than an infrared image. Thus, in step 206, is resized to the size of the infrared image. In some embodiments, the visible image is converted to gray-scale in this step. In other embodiments, the infrared image may be resized in this step to accommodate system requirements or constraints. Next, in step 208, both images are normalized to the same dynamic range (e.g., [0,1]).

A multi-scale search process 210 is then performed on the normalized images. During the multi-scale search process 210, the input images are resized in step 212 to a current processing scale. In each stage, the images are equalized by an adaptive histogram equalization process (e.g., contrast limited histogram equalization) in step 214. For each of the multi-scale stages, the images are smoothed by a Gaussian blur process in step 216.

After preprocessing of each image is applied, the parameter optimization can be performed. A parameter optimization process 220 includes an optimization of the deformation parameter array p, finding the value of p that best minimizes the loss function of Equation (3). To ease the optimization of p, a coarse-to-fine multi-scale search is used. In various embodiments, the search can be defined by the user or system designer depending on the image sensor pair resolution. In operation, the optimization process works in a multi-scale manner, where Popt (the deformation parameter) is found in lower scales first, and then refined in finer scales.

In various embodiments, the alignment system may be configurable through one or more of the following parameters:

Popt: Deformation parameters p=[δx,δy,s,ϕ)]. The identity transformation Popt=[0 0 1 0] may be given as a first estimate.

dampCoeff: Dampening coefficient for Popt. It enforces similarity of alignment in consecutive frames in a video. If processing independent images with possible different alignments, dampCoeff=0 may be used.

max_offset($\delta_{max}$): Maximum absolute value (in pixels) allowed for the translation in the deformation. The value of this parameter varies greatly depending on the resolution of the images and the camera set-up used.

Use the maximum offset in pixels to be expected between the images in the pair. For example, for a resolution of 120×160 pixels one could suggest a maximum deviation of ±10 pixels, therefore max_offset=10. In various embodiments, a min offset($\delta_{min}$) may also be defined.

max_zoom ($s_{max}$): Maximum allowed scaling factor allowed in the deformation. e.g. max_zoom=1.1 min_zoom ($s_{min}$): Minimum allowed scaling factor allowed in the deformation, e.g. min_zoom=0.9.

max_rot ($\phi_{max}$): Maximum absolute value of rotation (in degrees) allowed in the deformation, e.g. max_rot=5 will allow a maximum relative rotation between images of ±5°. In various embodiments, a min rot ($\phi_{min}$) may also be defined.

alpha ($\alpha$): Strength of penalization term in Equation (2) by default alpha=100. Use alpha=0 for disabling the penalization and thus disabling the parameter bounds.

Example implementations of a co-registration systems and methods will now be described with reference to FIGS. 3 & 4. In various embodiments, a system for co-registration of a series of thermal image and visible image pairs includes an image capture device, such as a camera operable to simultaneously capture infrared and visible images, and a host system operable to receive a stream of image pairs and perform the co-registration process as disclosed herein. In one embodiment, the host system includes a plurality of templates that may be selected allowing the co-registration process to be adapted for use with various image capture systems.

Figure 3:
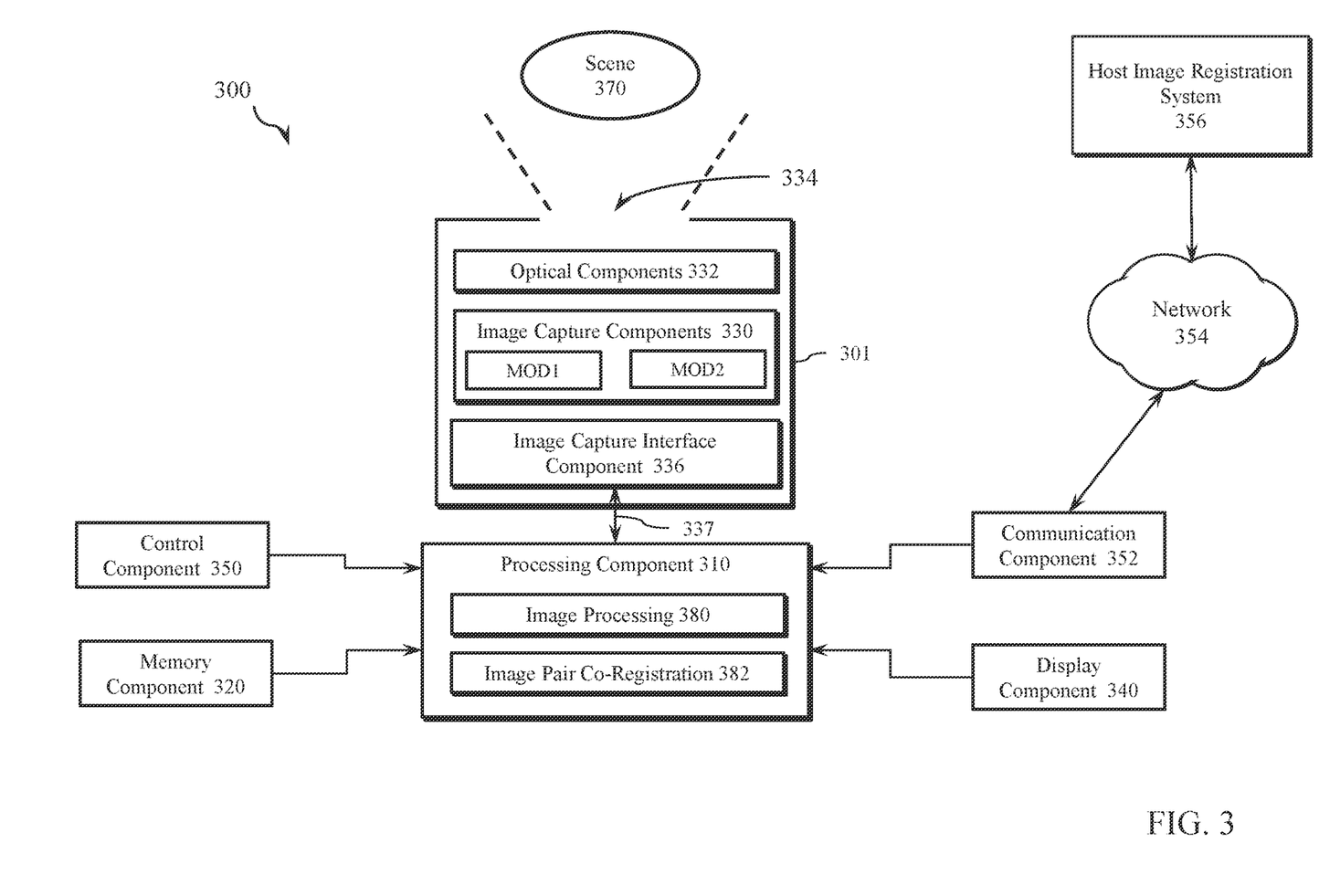
FIG. 3 illustrates an example imaging system, in accordance with various embodiments of the present disclosure.

Referring to FIG. 3, embodiments of an image capture system 300 for use with a co-registration host system will now be described. The image capture system 300 includes at least two sensor types producing images having different image capture characteristics. In various embodiments (i) the sensors may capture images in the same field of view or different fields of view, (ii) the sensors may capture images at the same frame rates or different frame rates, (iii) the sensors may capture images having the same resolution or different resolutions, and (iv) the sensors may be embodied in the same camera enclosure or in separate enclosures or devices. Other configurations may be implemented in accordance with the spirit and scope of the present disclosure to produce a pair of images having different image capture modalities.

In some implementations, the image capture device is part of a multi-spectral imaging system that can capture and process both visible and infrared images. In various applications, it is desired to align the pair of captured images on top of one another. For example, object detection may be performed on multiple images and the results combined to achieve more accurate object detection. In some embodiments, the systems and methods disclosed herein are configured to automatically align image pairs.

In various embodiments, the image capture system 300 may be implemented in an unmanned aerial system (UAS), including an unmanned aerial vehicle (UAV) or drone operable to capture visible and infrared images during flight. The UAS may comprises a standalone system that includes the host system and/or a distributed system that may include image processing and image co-registration on a cloud or other network server system. In various embodiments, after the UAV returns from a mission the images are transferred to a host system for alignment and analysis. In some embodiments, infrared images and visible images captured during a UAS mission may need to be combined into a single dataset using 2D and/or 3D image registration techniques. A single mission may consist of 100s of images captured during a time-period of up to 30 minutes. During this time the environmental conditions of the image capture components may change which can result in images capturing the same features of the scene being sensed at different signal levels even though the scene itself has not changed. The image co-registration process disclosed herein may be used to align visible and infrared image pairs (or other image pairs captured using different modalities) for use in further image processing.

The image capture system 300 may be an imaging system used, for example, to capture and process images to detect, classify and/or count objects that appear in a field of view, map terrain and physical structures and/or perform other image capture and processing functions. As illustrated, the image capture system 300 may be used for imaging a scene 370 in a field of view. The image capture system 300 includes a processing component 310, a memory component 320, image capture components 330, optical components 332 (e.g., one or more lenses configured to receive electromagnetic radiation through an aperture 334 in camera component 301 and pass the electromagnetic radiation to image capture component 330), an image capture interface component 336, an optional display component 340, a control component 350, a communication component 352, and other sensing components.

In various embodiments, image capture system 300 may be implemented as an imaging device, such as camera component 301, to capture image frames, for example, of the scene 370 in the field of view of camera component 301. In some embodiments, camera component 301 may include image capture components 330, optical components 332, and image capture interface component 336 housed in a protective enclosure. Image capture system 300 may represent any type of camera system that is adapted to image the scene 370 and provide associated image data. The image capture system 300 may be implemented with camera component 301 at various types of fixed locations and environments, or in a portable device or vehicle (e.g., a manned and/or unmanned land-based vehicle, watercraft, aircraft, spacecraft, or another vehicle).

Processing component 310 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), a graphics processing unit and/or any other appropriate combination of processing device and/or memory to execute instructions to perform any of the various operations described herein. Processing component 310 is adapted to interface and communicate with components 320, 330, 340, and 350 to perform method and processing steps as described herein. Processing component 310 may also be adapted to perform image processing (image processing component 380) and/or image pair co-registration (image pair co-registration component 382) as described herein. In various embodiments, the processing component 310 may also be adapted to detect and classify objects in the images captured by the image capture components 330, through image processing component 380.

It should be appreciated that processing operations and/or instructions may be integrated in software and/or hardware as part of processing component 310, or code (e.g., software or configuration data) which may be stored in memory component 320. Embodiments of processing operations and/or instructions disclosed herein may be stored by a machine-readable medium in a non-transitory manner (e.g., a memory, a hard drive, a compact disk, a digital video disk, or a flash memory) to be executed by one or more computers (e.g., logic or processor-based system) to perform various methods disclosed herein.

Memory component 320 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 310 is adapted to execute software stored in memory component 320 and/or a machine-readable medium to perform various methods, processes, and operations in a manner as described herein.

Image capture components 330 include, in one embodiment, two or more sensors for capturing image signals representative of an image, of scene 370. In one embodiment, the sensors of image capture components 330 provide for representing (e.g., converting) a captured infrared image signal of scene 370 as digital data (e.g., via an analog-to-digital converter included as part of the sensor or separate from the sensor as part of image capture system 300) using a plurality of modalities (e.g., MOD1 and MOD2). In some embodiments, the image capture components 330 include infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired. Infrared sensors may be implemented, for example, as microbolometers or other types of thermal imaging infrared sensors arranged in any desired array pattern to provide a plurality of pixels. In some embodiments, the image capture components 330 also include visible spectrum sensors configured to detect visible spectrum radiation from target scene.

Processing component 310 may be adapted to receive image signals from image capture components 330, process image signals (e.g., to provide processed image data), store image signals or image data in memory component 320, and/or retrieve stored image signals from memory component 320. In various aspects, processing component 310 may be remotely positioned, and processing component 310 may be adapted to remotely receive image signals from image capture components 330 via wired or wireless communication with image capture interface component 336, as described herein.

Display component 340 may include an image display device (e.g., a liquid crystal display (LCD)) or various other types of generally known video displays or monitors. Control component 350 may include, in various embodiments, a user input and/or interface device, such as a keyboard, a control panel unit, a graphical user interface, or other user input/output. Control component 350 may be adapted to be integrated as part of display component 340 to operate as both a user input device and a display device, such as, for example, a touch screen device adapted to receive input signals from a user touching different parts of the display screen.

Processing component 310 may be adapted to communicate with image capture interface component 336 (e.g., by receiving data and information from image capture component 330). Image capture interface component 336 may be configured to receive image signals (e.g., image frames) from image capture components 330 and communicate image signals to processing component 310 directly or through one or more wired or wireless communication components (e.g., represented by connection 337) in the manner of communication component 352. Camera component 301 and processing component 310 may be positioned proximate to or remote from each other in various embodiments.

In one embodiment, communication component 352 may be implemented as a network interface component adapted for communication with a network and may include one or more wired or wireless communication components. In various embodiments, a network 354 may be implemented as a single network or a combination of multiple networks, and may include a wired or wireless network, including a wireless local area network, a wide area network, the Internet, a cloud network service, and/or other appropriate types of communication networks. The image capture system 300 may be configured to operate with one or more computing devices, servers and/or one or more databases, and may be combined with other components. In some embodiments, image capture system 300 may send image pairs over network 354 (e.g., the Internet or the cloud) to a server system, such as host registration system 356, for remote image pair co-registrations and processing as disclosed herein.

Figure 4:
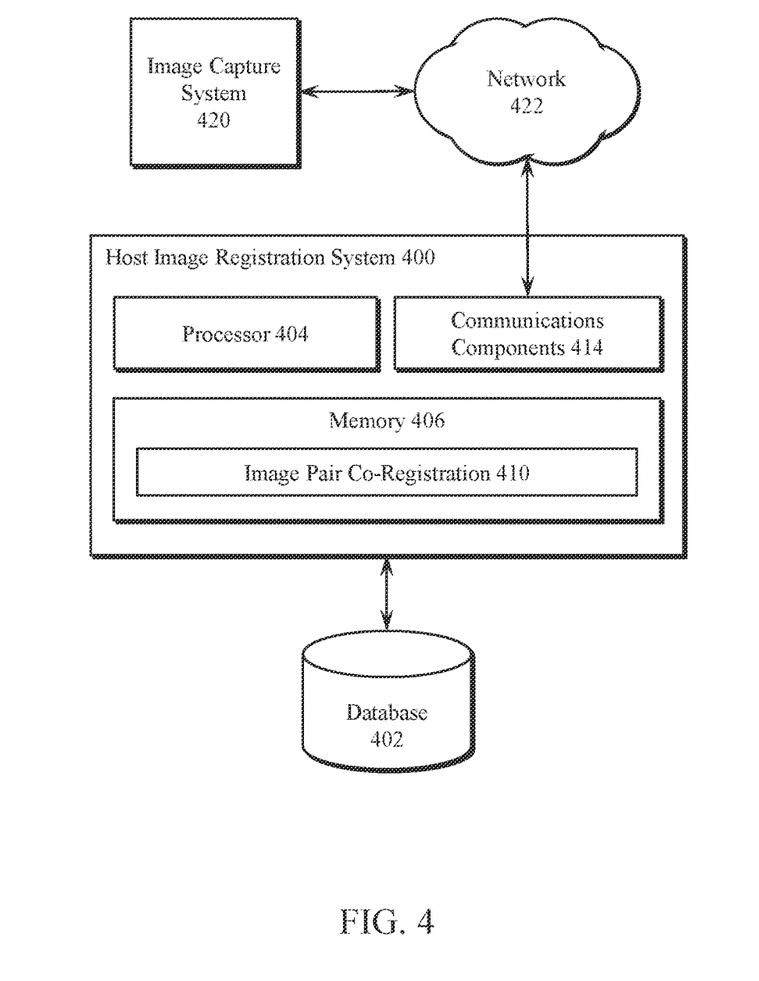
FIG. 4 illustrates an example host image registration system, in accordance with embodiments of the present disclosure.

Referring to FIG. 4, various embodiments of a host image registration system 400 will now be described. The host image registration system 400 may be implemented on one or more servers such as an application server that performs data processing and/or other software execution operations for generating, storing, classifying and retrieving images. In some embodiments, the components of the host image registration system 400 may be distributed across a communications network, such as communications network 422. The communications network 422 may include one or more local networks such as a wireless local area network (WLAN), wide area networks such as the Internet, and other wired or wireless communications paths suitable for facilitating communications between components as described herein. The host image registration system 400 includes communications components 414 operable to facilitate communications with one or more image capture systems 420 over the communications network 422.

In various embodiments, the host image registration system 400 may operate as a general-purpose image registration system, such as a cloud-based image registration system, or may be configured to operate in a dedicated system, such as a video surveillance system that stores video and images captured in real time from a plurality of image capture devices and identifies and classifies objects using a database 402. The host image registration system 400 may be configured to receive one or more image pairs (e.g., an image captured from infrared camera of a video surveillance system and a corresponding visible light image) from one or more image capture systems 420 and process associated co-registration requests.

As illustrated, the host image registration system 400 includes one or more processors 404 that perform data processing and/or other software execution operations for the host image registration system 400. The processor 404 may include logic devices, microcontrollers, processors, application specific integrated circuits (ASICs), field programmable gate arrays (FPGAs) or other devices that may be used by the host image registration system 400 to execute appropriate instructions, such as software instructions stored in memory 406, including image pair co-registration component 410 and/or other applications. The memory 406 may be implemented in one or more memory devices (e.g., memory components) that store executable instructions, data and information, including image data, video data, audio data, and network information. In various embodiments, the host image registration system 400 may be configured to interface with various network devices, such as an image capture system 420, desktop computer or network server, a mobile computing device such as a mobile phone, tablet, laptop computer or other computing device having communications circuitry (e.g., wireless communications circuitry or wired communications circuitry) for connecting with the host image registration system 400.

The communications components 414 may include circuitry for communicating with other devices using various communications protocols. In various embodiments, communications components 414 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 414 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications components 414.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   receiving a pair of images;
   defining a parametric deformation model providing an image deformation for each of a set of deformation parameters;
   defining a loss function based, at least in part, on at least one directional gradient of each of a processed pair of images obtained from the received pair of images by a process comprising applying the parametric deformation model, wherein the loss function is minimized when the pair of images are aligned; and
   performing a multi-scale search to determine an optimal deformation parameter that minimizes the loss function;
   wherein the optimal deformation parameter defines an alignment of the pair of images.

2. The method of claim 1, wherein the pair of images comprises a visible spectrum image and an infrared image.

3. The method of claim 2, wherein the process further comprises resizing the visible spectrum image to match the infrared image;
   wherein the loss function is based, at least in part, on comparing the directional gradients of the processed pair of images at each of a plurality of pixels.

4. The method of claim 1, wherein the process further comprises applying at least one lens distortion correction model to each of the pair of images.

5. The method of claim 1, wherein the process further comprises normalizing a dynamic range of each of the pair of images; and
   wherein the loss function is based, at least in part, on comparing the directional gradients of the processed pair of images in each of a plurality of directions at each of the plurality of pixels.

6. The method of claim 1, wherein the process further comprises resizing the pair of images to a current processing scale of the multi-scale search.

7. The method of claim 6, wherein the process further comprises, after resizing the pair of images to a current processing scale of the multi-scale search, applying adaptive histogram equalization to the pair of images to generate equalized images.

8. The method of claim 7, wherein the process further comprises applying Gaussian Blur to the equalized images.

9. The method of claim 1, wherein the loss function is based, at least in part, on determining a sum of squares of differences between absolute values of the directional gradients of the processed pair of images in each of a plurality of directions at each of a plurality of pixels.

10. The method of claim 1, wherein:
    each deformation parameter p is defined by p=[δx,δy,s,φ], where s is a scaling factor that controls image scaling, φ controls image rotation in degrees, and δx and δy control the image translation (in pixels) in horizontal and vertical directions, respectively; and
    for each deformation parameter, the loss function is based, at least in part, on a penalty term on the deformation parameter.

11. A system comprising:
    a processor; and
    a local memory operable to store a plurality of machine readable instructions which when executed by the processor are operable to cause the system to perform steps comprising:
    receiving a pair of images;
    defining a parametric deformation model providing an image deformation for each of a set of deformation parameters;

defining a loss function based, at least in part, on at least one directional gradient of each of a processed pair of images obtained from the received pair of images by a process comprising applying the parametric deformation model, wherein the loss function is minimized when the pair of images are aligned; and performing a multi-scale search to determine an optimal deformation parameter that minimizes the loss function;

wherein the optimal deformation parameter defines an alignment of the pair of images.

12. The system of claim 11, wherein the pair of images comprises a visible spectrum image and an infrared image; and wherein the system further comprises a plurality of image capture components, including a visible spectrum sensor operable to capture the visible spectrum image, and an infrared sensor operable to capture the infrared image.

13. The system of claim 12, further comprising optical components arranged to pass an image of a scene to the image capture components; and wherein the process further comprises applying at least one lens distortion correction model to each of the pair of images, the lens distortion correction model comprising a model of the optical components.

14. The system of claim 11, wherein:

the loss function is based, at least in part, on comparing the directional gradients of the processed pair of images in each of a plurality of directions; and the process further comprises:

normalizing a dynamic range of each of the pair of images.

15. The system of claim 11, wherein:

the loss function is based, at least in part, on comparing the directional gradients of the processed pair of images at each of a plurality of pixels; and the process further comprises:

resizing the pair of images to a current processing scale of the multi-scale search.

16. The system of claim 15, wherein the process further comprises, after resizing the pair of images to a corresponding processing scale of the multi-scale search, applying adaptive histogram equalization to the pair of images to generate equalized images.

17. The system of claim 16, wherein the process further comprises applying Gaussian Blur to the equalized images.

18. The system of claim 11, wherein the loss function is based, at least in part, on determining a sum of squares of differences between absolute values of the directional gradients of the processed pair of images in each of a plurality of directions at each of a plurality of pixels.

19. The system of claim 11, wherein each deformation parameter p is defined by $p=[\delta x, \delta y, s, \phi]$, where s is a scaling factor that controls image scaling, $\phi$ controls image rotation in degrees, and $\delta x$ and $\delta y$ control the image translation (in pixels) in horizontal and vertical directions, respectively; and for each deformation parameter, the loss function is based, at least in part, on a penalty term on the deformation parameter.

20. An unmanned aerial system comprising the system of claim 11.

* * * * *